United States Patent
Mrvaljevic et al.

(10) Patent No.: US 9,909,908 B2
(45) Date of Patent: *Mar. 6, 2018

(54) PROFILES FOR STREAMLINING CALIBRATION TEST

(71) Applicant: Fluke Corporation, Everett, WA (US)

(72) Inventors: Nikola Mrvaljevic, Mountlake Terrace, WA (US); Randy Peterson, Mukilteo, WA (US); Joseph V. Ferrante, Redmond, WA (US); Dileepa Prabhakar, Mill Creek, WA (US); David Clarence Dyck, Lake Forest Park, WA (US)

(73) Assignee: Fluke Corporation, Everett, WA (US)

( * ) Notice: Subject to any disclaimer, the term of this patent is extended or adjusted under 35 U.S.C. 154(b) by 573 days.

This patent is subject to a terminal disclaimer.

(21) Appl. No.: 14/535,231

(22) Filed: Nov. 6, 2014

(65) Prior Publication Data

US 2015/0134289 A1     May 14, 2015

Related U.S. Application Data

(60) Provisional application No. 61/962,317, filed on Nov. 13, 2013, provisional application No. 61/962,325, filed on Nov. 13, 2013.

(51) Int. Cl.
*G01D 18/00* (2006.01)
*G01K 15/00* (2006.01)
(Continued)

(52) U.S. Cl.
CPC ........... *G01D 18/008* (2013.01); *G01K 15/00* (2013.01); *G01K 15/005* (2013.01);
(Continued)

(58) Field of Classification Search
None
See application file for complete search history.

(56) References Cited

U.S. PATENT DOCUMENTS

| 5,764,891 A | 6/1998 | Warrior |
| 5,796,602 A | 8/1998 | Wellan et al. |

(Continued)

FOREIGN PATENT DOCUMENTS

| CN | 1348541 A | 5/2002 |
| CN | 101608927 A | 12/2009 |

(Continued)

OTHER PUBLICATIONS

Alessandra Costanzo in Design and test of a smart-space interaction device combining RFID and electromagnetic interferometry, 978-1-61284-757-3/11/$26.00 C2011 IEEE, 4 pages.*

(Continued)

*Primary Examiner* — Tung Lau
(74) *Attorney, Agent, or Firm* — Seed IP Law Group LLP

(57) ABSTRACT

A calibrator has profiles for holding locators for items in a tree-like database of smart device that monitors a process. The calibrator is connected to the smart device and obtains tag and other identity information to find the profile for the smart device. When a profile is located, the calibrator displays a list of calibration setup items and favorite items and loads the items on the list into the calibrator as default inputs or settings.

19 Claims, 4 Drawing Sheets

(51) Int. Cl.
*H04L 29/08* (2006.01)
*G05B 19/042* (2006.01)
(52) U.S. Cl.
CPC ........ *G05B 19/0426* (2013.01); *H04L 67/303* (2013.01); *H04L 67/12* (2013.01)

(56) References Cited

U.S. PATENT DOCUMENTS

| | | | |
|---|---|---|---|
| 5,903,455 | A | 5/1999 | Sharpe, Jr. et al. |
| 6,377,859 | B1 | 4/2002 | Brown et al. |
| 6,976,366 | B2 | 12/2005 | Starling et al. |
| 7,054,695 | B2 | 5/2006 | Opheim et al. |
| 7,117,122 | B2 | 10/2006 | Zielinski et al. |
| 8,200,783 | B2 | 6/2012 | Eryurek et al. |
| 8,364,431 | B2 | 1/2013 | Russell |
| 8,538,719 | B2 | 9/2013 | Vetter et al. |
| 8,555,190 | B2 | 10/2013 | Ann et al. |
| 2002/0120375 | A1 | 8/2002 | Draoullec |
| 2004/0262387 | A1 | 12/2004 | Hart |
| 2005/0075968 | A1 | 4/2005 | Apostolides |
| 2006/0028225 | A1 | 2/2006 | von Appen |
| 2008/0294988 | A1 | 11/2008 | Nicholas |
| 2012/0004743 | A1 | 1/2012 | Anne et al. |
| 2012/0038458 | A1 | 2/2012 | Toepke et al. |
| 2013/0138467 | A1 | 5/2013 | Small |

FOREIGN PATENT DOCUMENTS

| | | |
|---|---|---|
| CN | 102859452 A | 1/2013 |
| JP | 5-157592 A | 6/1993 |
| JP | 11-346162 A | 12/1999 |
| JP | 2008-004988 A | 1/2008 |
| JP | 2012-112866 A | 6/2012 |
| KR | 10-0620005 B1 | 9/2006 |
| KR | 10-2009-0070630 A | 7/2009 |
| KR | 10-0950434 B1 | 4/2010 |
| WO | 00/50848 A1 | 8/2000 |
| WO | 2013/117818 A1 | 8/2013 |

OTHER PUBLICATIONS

Stefan Pitzek in Configuration and Management of Fieldbus Systems, 2005, 20 pages.*
Supplementary European Search Report, dated May 29, 2017, for European Application No. 14861816.8-1853 / 3069351, 14 pages.
International Search Report and Written Opinion dated Feb. 6, 2015, issued in corresponding International Application No. PCT/US2014/064403, filed Nov. 6, 2014, 9 pages.
International Search Report and Written Opinion issued in corresponding International Application No. PCT/US2014/065286, filed Nov. 12, 2014, 7 pages.
Bowden, "HART Device Description Language: an example," retrieved from http://www.romilly.co.uk/ddexampl.htm on Apr. 7, 2017, 2 pages.
Emerson Process Management "475 Field Communicator," User's Manual, Rev H, May 2013, 134 pages.
Emerson Process Management "475 Field Communicator," User's Manual, Rev K, pp. 16-17, 27, 48, 50-53, 55-56, 66, 69, 71, May 2015, 15 pages.
Emerson Process Management, "Rosemount 3051S ERS Configuration Data Sheet," Configuration Data Sheets 00806-0100-4804, Rev AA, 2009, 00813-0100-4801, Rev JA, Apr. 2007, and 008060100-4801, Rev EA, Jul. 2013, 12 pages.
Emerson Process Management, "Rosemount 3051S Electronic Remote Sensors," Reference Manual 00809-0100-4804, Rev AA, Jan. 2011, 13pages.
Emerson Process Management, "Rosemount 644 Temperature Transmitter," Product Data Sheet 00813-0100-4728, Rev RA, Catalog 2011-2012, 22 Pages.
Extended European Search Report, dated Apr. 4, 2017, for European Application No. 14862884.5-1853 / 3069488, 13 pages.
Fluke Corporation, "Transmitter Calibration with the Fluke 750 Series Documenting Process Calibrator," Document No. 3792201B A-EN-N, 2011 8 pages.
Fluke Networks, "753/754 Documenting Process Calibrator," Users Manual, Jul. 2011, 128 Pages.
Fluke Networks, "AirCheck Wi-Fi Tester," retrieved from http://www.flukenetworkd.com/enterprise-network/network-testing/AirCheck-Wi-Fi-Tester on Nov. 6, 2013, 8 pages.
Fluke Networks, AirCheck™ Wi-Fi Tester Getting Started Guide, PN 3434814 Rev.3, 3/12, Dec. 2009, 24 pages.
Fluke Networks, "HART® Transmitter Calibration," Document No. 1262439H A-EN-N, 2004, 16 pages.
Fluke Networks, "Innovative Solutions for Successful Wireless Network Management," Document No. 3996296B, 2012, 14 pages.
HART Communication Foundation, "Calibrating HART Transmitters," Document No. HCF_LIT-054, Revision 1.1, Nov. 2008, 14 pages.
Omega, "PX750 Pressure Transmitter User's Guide," Appendix, p. A-1, 1999, 3 pages.
Omega, "PX750 Pressure Transmitter User's Guide," Appendix, p. A-2, 1999, 3 Pages.
Pirret, "Maintenance and Calibration of HART Field Instrumentation," Fluke Corporation, 2010, 7 pages.
CN Application No. 201480062274.1, First Office Action dated Jul. 18, 2017, 6 pages.

* cited by examiner

PROFILES FOR STREAMLINING CALIBRATION TEST

CROSS-REFERENCES TO RELATED APPLICATIONS

This application claims the benefit of Provisional Application No. 61/962,317, filed Nov. 13, 2013, and Provisional Application No. 61/962,325, filed Nov. 13, 2013, the disclosures of which are hereby incorporated by reference herein.

BACKGROUND

In process plants, field devices that sense or control parameters for processing chemicals and pharmaceuticals are smart devices. "Transmitter" is often synonymous with smart device. A smart device is a measurement and/or control module with a transmitter that can communicate with host devices over a wired or wireless communication channel using one or more standard protocols.

Host devices include computers, calibrators, communicators, tablets and personal digital assistants. Some standard protocols include HART, an acronym for Highway Addressable Remote Transducer, or FOUNDATION Fieldbus. HART is an industry standard for a hybrid protocol that enables communications between smart field devices and a control system that employs legacy 4-20 mA wiring. FOUNDATION Fieldbus is an all-digital protocol.

A smart device with HART protocol has a microprocessor and one or more memories. The memories hold data about the manufacturer of the device, its current readings for a primary variable and other variables, and its ranges, as appropriate for variables. The microprocessor is programed to perform a number of specific operations and to respond to predetermined commands. Such commands include and are not limited to reading manufacturing information and reading a primary variable (e.g., pressure) and one or more secondary variables (e.g., temperature). Other commands are used to calibrate the smart device and include setting the range of the measured variables, including their upper and lower range limits.

A smart device has one or more transducers that measure physical parameters, such as pressure or temperature or whether a valve is open or closed. Transducers convert a signal of parameters in one form of energy (e.g., pressure, flow) into electrical signals. The output of the transducer is converted from analog to digital values by an analog-to-digital converter whose output is input to a microprocessor. Some smart devices may have a microprocessor and circuitry for performing A-to-D and D-to-A conversion in a single chip. Depending upon the type of communication network, after processing, the microprocessor output may be converted into an analog value for transmission via a wired or wireless transmitter.

Each smart device is associated with a Device Description. A Device Description (DD) is an electronic data file describing the capabilities of a smart device, defining a hierarchical structure of read-only parameters, read/write parameters, standard operating procedures (methods) and other information for use by a communication host. A DD has menus and graphic display features that are used by host applications (including handheld calibrators, communicators and other hosts) to access all parameters and data in the corresponding smart device. A DD and its menu structure are unique to a device and a device revision. A DD for one device cannot be used with a completely different device from another manufacturer, even if that other device were to offer the same functionality. However, DDs do support multi-vendor interoperability. Each device may be calibrated to specific parameters so that process managers may configure transmitters from one manufacturer to replace a device from another manufacturer. The DD does not contain any information about current values in a smart device but enables a host to read the memory of the device and to acquire items of device information that are stored in the device transmitter. Device information includes tag information given by a user to the device to identify its location or function and information identifying the manufacturer, model, and revision of the device. It may also include the units of the primary variable of the device, the lower range value, upper range value, damping, and transfer functions. Many devices have linear transfer functions but some have square root transfer functions, or other non-linear transfer functions.

The DDs allow the process operator to set hundreds of device variables in the smart device. Process operators use DDs to integrate smart devices of different manufacturers into a process. However, a technician calibrating a device needs access to a relatively small number of device variables that are set in the smart device. Nevertheless, access to those device variables is only possible by following the tree-structure of the DD.

The DD is held in a memory of the calibrator or communicator. A DD comprises multiple levels and is arranged in the tree-like structure with branches between levels. A DD is similar to a database of information about the device, and includes algorithms for use when attempting to accomplish specific tasks with the device, such as sensor trim, and locations for storing parameters for the smart device. DDs provide the information needed by a host such as a communicator, calibrator, host application, or control system to properly access and display important device information located in smart devices.

A communication host uses a DD to communicate with a smart device. A communication host is capable of communicating with smart devices using one or more protocols with the ability to display various parametric values and allowing the user to set configuration parameters on such devices. Communication hosts include and are not limited to central controllers, calibrators and communicators. A host may use DDs that persist in the host's storage memory in order to provide access to the full capabilities, as described by the provider of the DD, of that smart device.

The DD is an electronic data file describing the capabilities of a smart device, defining a hierarchical (tree) structure of read-only parameters, read/write parameters, standard operating procedures (methods) and other information for use by a host. A DD is typically written by the manufacturer of a smart device. Specifications for the authoring and structure of DDs are controlled by standard bodies such as IEC and ISA with contributions from HART Communications Foundation, Fieldbus Foundation and PROFIBUS and PROFINET International. It declares or explains a device such as a smart device transmitter. Actual processing is done by communication host devices such as documenting calibrators.

The tag is stored in the memory of the smart device, not in the DD. The tag parameter/field is entered in the smart device by the end user. It is typically, but not necessarily always, used to name the device as well as identify its location or function in a plant. A host, such as a calibrator or communicator uses universal commands to locate and read tag information. A host also reads the DD and navigates via the DD tree to locations in the DD that hold, its primary, secondary, and other variables and its parameters.

Smart devices used in process control undergo aging, wear, and tear. It is best practice to periodically inspect smart devices to see whether they have maintained their desired settings and to calibrate or adjust the smart devices that are out of calibration tolerance. Calibration is a process for verification (test) and adjustment (trim) of a smart device. Process calibrators store calibration specification and configuration information that can be recalled for use during verification, adjustment and for other uses. This information is referred to as calibration setup and includes, but is not limited to:

1. Steps for calibration as a sequence of operations and conditional checklists for execution during calibration;
2. The parameter for the calibrator to measure (electrical, physical or digital) during verification;
3. The parameter for the calibrator to source (electrical or physical) during verification;
4. The test range for the verification in the form of 100% (upper test range) and 0% (lower test range) values;
5. The test specification (tolerance) for the verification; and
6. The test strategy for the verification, including the number of test points, sequence and distribution of those test points and the transfer function.

Verification is a process of comparing one or more outputs of a smart device with corresponding standard inputs against the test specifications. There are two stages to verification: (1) As Found is the calibration state of the smart device at the start of the calibration process; and (2) As Left is the calibration state of the smart device at the end of the calibration process. Sometimes, the As Left stage is skipped if the As Found verification confirms that the smart device is within calibration specifications and no adjustment was performed.

During the As Found stage, a technician tests the input, the transfer function and the output of the smart device at the low range value, the high range value and one or more points between low and high range values and records the results as the As Found results. If any result is out of range of tolerance, the technician uses a communicator and/or calibrator to perform one or more iterations of adjustment to achieve results as close as practical to tolerance. After an adjustment is made, the As Left verification is performed to confirm that the results are again within specification. The adjustment and As Left verification steps may be repeated multiple times as needed.

Calibrators verify and adjust smart devices by supplying standard inputs into devices at the required accuracy during the process of calibration. This is commonly referred to as a "source" from the calibrator. The inputs sourced may be known values of electrical or physical parameters, including and not limited to voltage, current, pressure, and temperature. A calibrator also provides the capability to measure output from the device under calibration. The parameters being measured may be electrical, physical or digital.

Calibration includes the capability to adjust the zero and gain to set a desired range. In order to calibrate a smart device, a highly precise and known standard measured quantity, such as a known pressure or a known temperature, is compared to the output reading of the device. Sometimes an electrical value (ohms or millivolt) is applied to the transmitter, when the transmitter measures temperature using an RTD or thermocouple. If the transmitter in the smart device indicates a value different by more than an allowable tolerance from the known standard, the transmitter is adjusted (trimmed) and then retested so that its output corresponds to the standard or within tolerable limits thereof.

Typically, calibration of a variable monitored by a smart device is checked at several points in the prospective calibrated span of the variable. Span is defined as the difference between the upper and lower range values. The zero value is the lower limit of the span range and the range is the difference between upper and lower range values. The calibration range (span) often differs from the operating range, which refers to the capability of the device.

For example, an electronic pressure transducer in a smart device may have a range capability of 0-600 psi and output of 4-20 milliamps (mA). However, a process engineer may determine the smart device will be calibrated for 50-200 psi=4-20 mA. Therefore, the calibration range would be specified as 50-200 psi=4-20 mA. In this example, the zero input value is 50 psi and zero output value is 4 mA. The input span is 150 psi and the output at the upper limit is 20 mA.

Smart devices are typically calibrated to show a linear, square root, or other transfer relationship between input and output. An ideal graph of a linear transfer relationship in a calibrated smart device is an input-output curve that is a straight line beginning at the origin of the X and Y axes and having a predetermined slope. Zero error is corrected by parallel shifting the input-output characteristic curve of the smart device; span error is adjusted by changing the slope of the curve.

Some calibrators are process calibrators and are capable of measuring and sourcing parameters most commonly used in process industries. Some process calibrators are documenting process calibrators (DPC). A DPC, in addition to providing the capabilities of a process calibrator, provides the ability to electronically record (i.e., document) the results of a calibration. DPCs that are capable of communicating with smart devices combine the functionality of a portable calibrator with that of a handheld field communication host into a single tool. DPCs may have additional capabilities such as the ability to transfer data from a personal computing device and/or create and store calibration setup information for later recall and use during calibration.

SUMMARY

The following summary is provided to introduce a selection of concepts in a simplified form that are further described below in the Detailed Description. This summary is not intended to identify key features of the claimed subject matter, nor is it intended to limit the scope of the claimed subject matter.

DDs are used to set the hundreds of variables in a smart device. DDs were added to documenting process calibrators (DPC) to create DD-based DPCs which made it easier for a technician to perform calibration of smart devices. DD-based DPCs nevertheless have experienced problems. For example, DDs in the DPCs have to be updated each time a new smart device is installed and when revisions were made to existing devices, all of which may occur on a frequent basis. Also, conventional DD-based DPCs do not automatically provide the measure and source parameters and settings of the DPC to calibrate a smart device and they do not provide information about the adjustment procedures to invoke during calibration. There is currently no standard way to specify such information on the smart device or in the DD for that device. While some DPCs may support a fuller set of devices, possibly using DDs, nevertheless the calibration process is not streamlined because of reasons mentioned above. Each time a technician performs a calibration, he or she still has to navigate the DD tree to select the smart device variable to measure for verification and separately navigate the DD tree to perform adjustment.

Calibration remains a tedious and repetitive process. In order to calibrate one smart device, a technician navigates the DD, which has a tree-like structure with multiple menus, levels and branches, to reach the desired information. Smart devices may have hundreds of items in different levels and branches and often the technician will need only a few of the items to calibrate the smart device. However, each time the technician needs a new item, he or she must return to the start of the DD tree and navigate along its levels and branches to reach the new item.

Embodiments of an instrument for calibrating a smart device, also referred to herein as a calibrator, have a memory for holding programs and data and a processor for reading and executing programs. In some embodiments, the processor is a digital signal processor with on-board analog-to-digital conversion circuitry. In other embodiments, the processor is a microprocessor and has separate analog-to-digital circuitry. The calibrator has an input coupled to the processor for receiving measured values of parameters from smart devices. It also has one or more outputs (sources) that may be coupled to the smart device to apply a known source parameter value to the smart device. In some embodiments, the output (source) of the calibrator is provided by an auxiliary device such as a pressure module which provides a known pressure to the smart device. The calibrator compares the source value to the measured value and displays the difference, if any, between the two values.

The calibrator has a memory that holds one or more profiles. Each profile is a unique container associated with only one device and one device tag. In other embodiments, the profile may be associated with multiple devices and device tags. Each profile includes, among other items, the locators for a number of DD items, including favorites, and one or more sets of calibration configuration values, including and not limited to a primary variable, other variables selected by a user. The processor operates the calibrator to: (a) use calibration configuration values and favorite profile parameter values to perform calibration verification on the smart device; and (b) use favorite profile parameters to help the user adjust the measured parameters of the smart device.

In some embodiments, profiles include and are not limited to values for parameters of the smart device and for calibration setup items. The use of profiles is not limited to calibration. A profile is a container of information for use by any host, including a communicator, as well as a calibrator, and it contains a list of pre-selected favorite DD items and user selected favorite DD items. The favorites include device variables that may be used to conduct calibration verification and sensor trim/adjustment.

In some embodiments, the favorites include parameters such as one or more of the group comprising pressure, temperature, flow, and position. The calibrator technician can review the profiles stored in calibrator to see if there is an existing profile for the smart device. If there is no existing profile, the technician may create a new profile. If there is an existing profile, the calibrator loads the favorites and calibration setup items from the profile as default values for a verification operation and conducts an As Found verification and other calibrator operations. The technician remains in control of the calibration operation and may manually change each variable for conducting verification and other calibration operations.

Also disclosed herein are embodiments for methods and systems that reduce the time required for calibrating smart devices by providing a calibrator that retains parameters as a list of favorite parameters. Some favorite parameters may be predetermined by the calibrator manufacturer and others may be designated by the user of the calibrator. In some embodiments, favorites may be entered at any time including and not limited to times when the calibrator is online and connected to a smart device transmitter or other times when the calibrator is offline and disconnected from the transmitter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
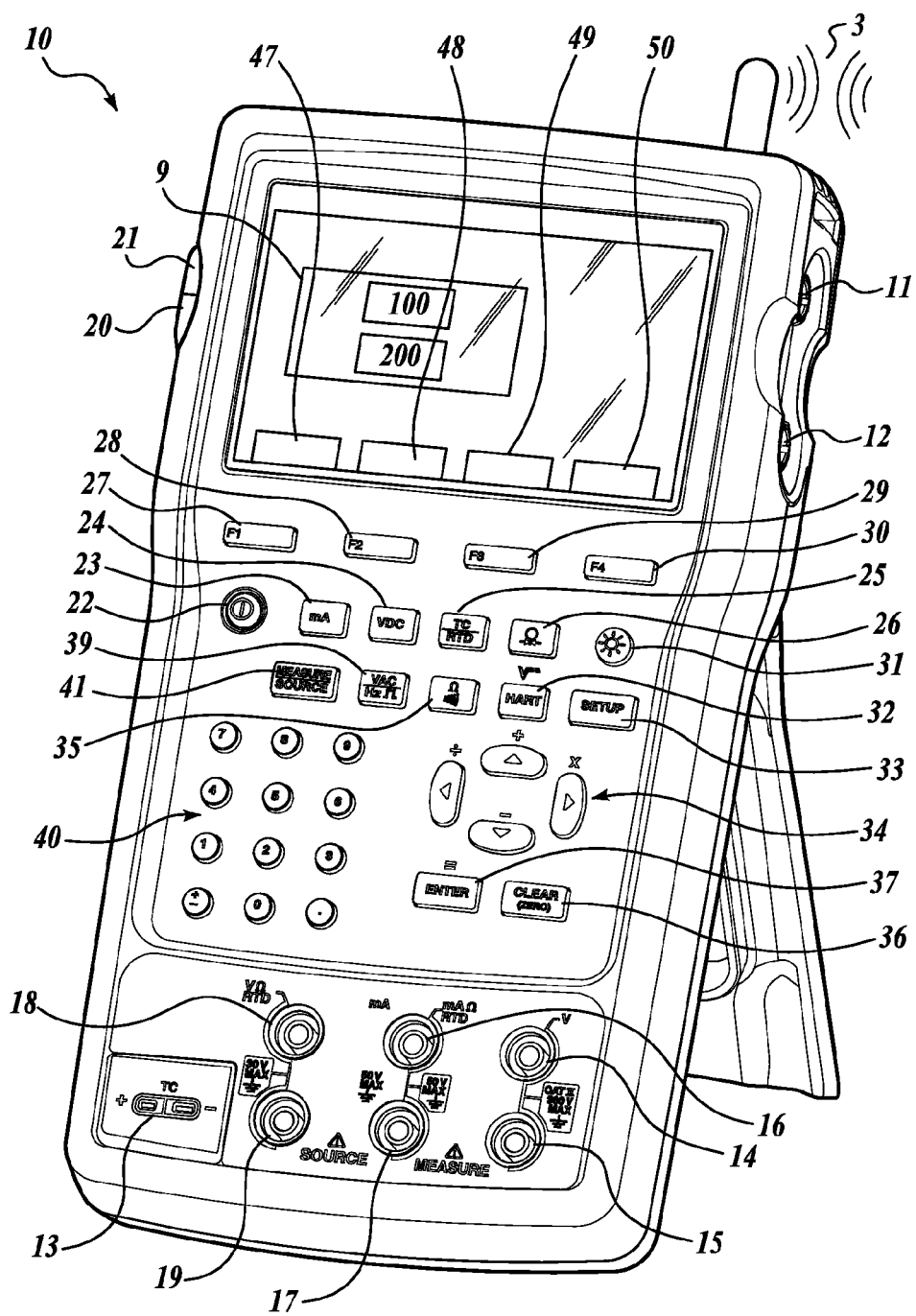
FIG. 1 is a perspective view of a calibrator representative of one or more embodiments.

The following definitions are adopted for certain terms used in this patent:

Profile: A profile is a container that includes a collection of calibration setup items and device information items associated with each smart device including a device tag, a bus protocol, manufacturer, and model. Each transmitter is unique and has a corresponding unique profile of favorites and calibration setup items.

Favorite: A favorite is a unique identifier for the location (hereinafter "locator") of information in the smart device memory that maps to a specific and unique item in the manufacturer-provided Device Descriptor (DD) tree.

Favorite Entry: A single entry in a list of favorites. Also used as a synonym for favorite. There are slot favorites and user favorites.

Slot Favorite: A slot favorite is one defined by a host manufacturer that informs the user, via a manufacturer-defined name, which specific DD item to map to that slot. It includes a locator and maps to a specific and unique item in the manufacturer-provided Device Descriptor (DD) tree. However, a slot is not restricted to that specific DD item. Slots may be the most commonly used DD items by end users for calibration or inspection. Slots are DD items that streamline calibration, by specifying the process variable, upper and lower limits, or the sensor trim method before calibration begins, and for use during the process of calibration. Slots reduce the need to prompt the user to navigate through the entire DD tree and select these items each time they perform the calibration of this smart device.

User Favorite: A user favorite is a free-form favorite that the user can designate for any DD item. User favorites do not have any host manufacturer-defined names (other than perhaps generic names like "User Favorite 1", "User Favorite 2", etc.) and the DD label itself may be used in the favorites list.

Calibration setup: This specifies the measurement mode, source mode, and upper test range, and lower test range, number of test points including their sequence and distribution, and transfer function, including square root mode and others. See the Background, above, for specific examples of calibration setup items.

DD Tree: The complete DD menu structure with its multiple levels and multiple branches.

DD Item: A DD item is any item, including menus and sub-menus, in the DD tree.

DD Tree View: This is commonly referred to as the communicator view. The entire DD tree can be navigated and used as intended by the DD writer, sometimes for a specific host type (handheld or a PC), in this view.

Favorites View: This is an alternative view. In this view, information (live and/or offline) of DD Items from the DD Tree that the user has added to the favorites list will be displayed. On each favorite entry, the user can perform actions similar to what he would have been able to perform from the DD Tree on that DD item, such as reading or writing a value to the smart device. The favorites view is a flat list of slots and user favorites.

Turning to FIG. 1, there is shown one embodiment of a calibrator 10 with a display 9 and a number of jacks and buttons for performing a calibration operation. Jack 11 connects the calibrator 10 to smart device 80 (see FIG. 2). Module connector 12 connects calibrator 10 to a pressure module 2 (see FIG. 2). In an alternative embodiment, module connector 12 connects calibrator 10 to a drywell module. A thermocouple (TC) input/output jack 13 measures or simulates thermocouples and accepts a miniature polarized thermocouple plug with flat, in-line blades. Jacks 14, 15 are input jacks to measure voltage, frequency, or three- or four-wire RTDs (Resistance Temperature Detectors). Jacks 16, 17 source or measure current, measure resistance and RTDs, and supply loop power. Jacks 18, 19 are output jacks to source voltage, resistance, frequency, and to simulate RTDs. Jack 20 is for the battery charger/universal power supply. USB port (Type 2) 21 connects the calibrator 10 to a USB port on a PC.

The calibrator 10 has a number of control buttons that enable the technician to perform a variety of manual functions. These buttons include an on and off button 22. Buttons 23-26, 35 and 39 are operated to select one or more of the sources (outputs) and measured parameters including voltage, current, temperature, pressure, etc. Softkeys 27-30 are operated to select a function indicated in the labels 47-50 in the display 9 above each softkey. Button 31 adjusts the backlight intensity (three levels). A user operates button 33 to manually enter a setup mode or to change operating parameters. Bus key 32 permits the technician to toggle the calibrator 10 between a digital bus communication mode and analog operation, if any. A technician may use the arrow buttons 34 for scrolling menus and increasing or decreasing values shown on display 9. There is a numeric key pad 40 for making numeric entries. Button 41 cycles the calibrator 10 through MEASURE, SOURCE, and MEASURE/SOURCE modes.

Figure 2:
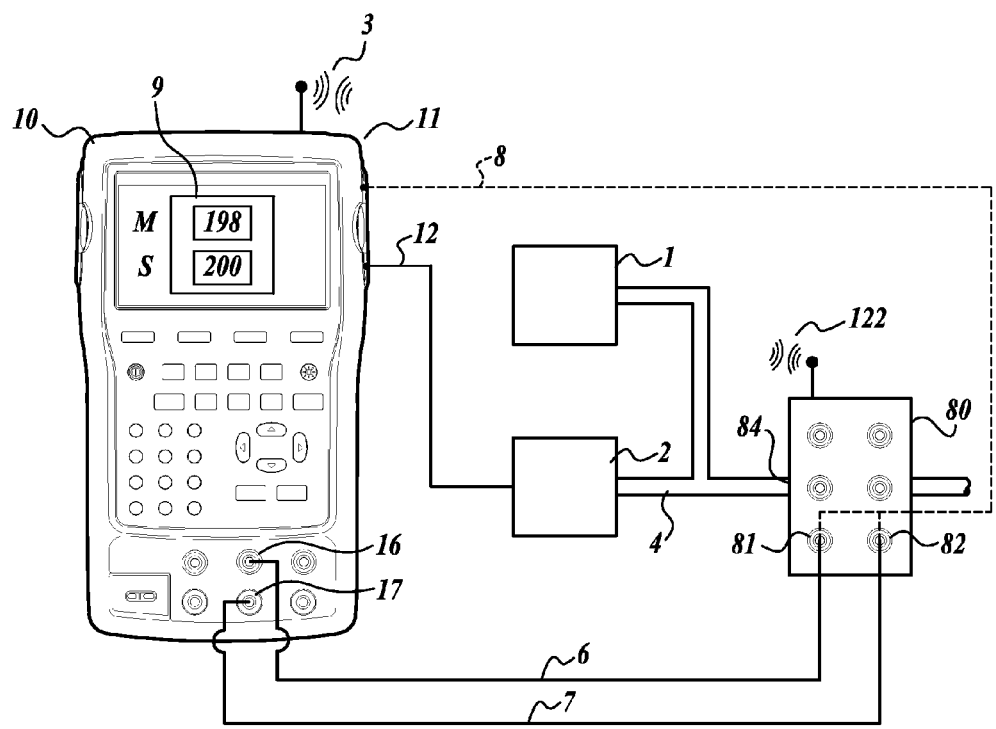
FIG. 2 is a schematic representation of the calibrator of FIG. 1 connected to a pressure module, a pump, and a smart device.

Turning to FIG. 2, the calibrator 10 is shown connected to a smart device 80. The smart device 80 has I/O terminals 81, 82. Cables 6, 7 electrically connect terminals 16, 17 of the calibrator to the smart device 80. Also shown is a pump 1 for applying pressure to a pressure line 4 coupled between a pressure module 2 and a pressure input port 84 of the smart device 80. The pump 1 is operable to apply one or more pressures to the smart device 80. The applied pressure is sensed by pressure module 2 which is a highly precise device for measuring pressure. A signal line 12 connects the pressure module 2 to the calibrator 10 where the applied pressure of the pump 1 is shown on the display 9. Also shown on display 9 is the output pressure transmitted to the calibrator 10 by the smart device 80. Output signals may also be transmitted via wireless transceiver 122 of the smart device 80 and received by wireless transceiver 3 of the calibrator 10. In an alternative embodiment, a drywell may be used in place of the pressure module 2, and the hand pump 1 may be eliminated. The pump 1 may be a hand pump, a mechanical pump or alternative source of pressure.

Figure 3:
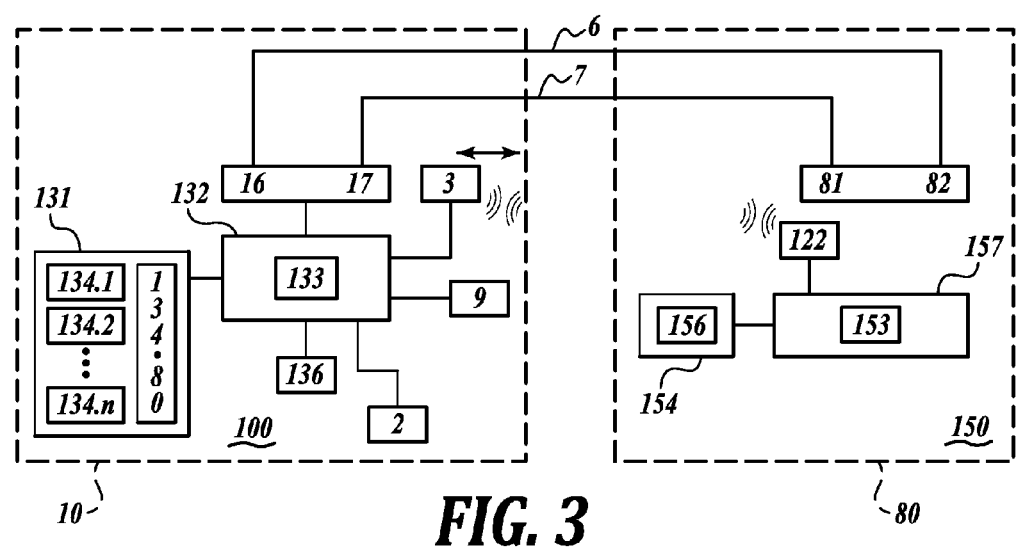
FIG. 3 is a schematic representation of the smart device.

Referring to FIG. 3, the calibrator 10 has a controller 132 which includes a processor 133 for receiving input signals from the smart device at jacks 16, 17, or 11 (see FIG. 1) or transceiver 3 and from the pressure module 2. The processor 133 may be a microprocessor or a digital signal processor. If the signals representative of the output of the smart device 80 are analog, they may be converted from analog into digital signals by other suitable circuitry well known to those skilled in the art. As an alternative, the processor 133 may be a digital signal processor and have built-in analog-to-digital conversion circuitry. In both cases, the processor 133 is capable of arithmetic logic operations and of executing instructions of one or more programs. Operator input apparatus 136 represents the numeric keypad 40, and other hard and soft keys shown in FIG. 1. The calibrator 10 has a storage system 131 and a display 9.

Depending on the particular configuration and type of device, the storage system 131 may include system memory in the form of volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor 133. In this regard, the processor 133 serves as a computational center of the calibrator 10 by supporting the execution of program instructions.

The information stored in the storage system 131 may include, but is not limited to, program modules and data to be accessed by the processor 133. Generally, program modules may include routines, applications, objects, components, data structures, etc., that perform particular tasks or implement particular abstract data types. It will be appreciated that system memory and storage memory described herein are merely examples of various computer-readable storage media.

One or more profiles 134.1, 134.2 . . . 134.n are stored in the memory 131. Each profile is associated with a device through the use of device identification information, such as a device tag, and may be accessed by using that information. Each profile includes calibration setup information and favorite information. In particular, the memory 131 stores a DD 134.80 for the smart device 80. The DDs are tree-like databases having multiple menus, levels and branches for holding parameters, and other information to control the operation of the smart device 80.

The storage system 131 may also be configured to store information received from a smart device 80 through the I/O terminals 16, 17, or jack 11 or wireless transceiver 3. For example, results of the As Left verification for smart device 80 are stored in storage system 131 or may be stored in the profile 134 associated with the smart device.

The smart device 80 has a controller 157 which includes a processor 153 for receiving input information from the I/O terminal 81, 82 and the wireless transceiver 122. Depending on the particular configuration and type of device, the storage system 154 may include system memory 156 in the form of volatile or nonvolatile memory, such as read only memory ("ROM"), random access memory ("RAM"), EEPROM, flash memory, or other memory technology. Those of ordinary skill in the art and others will recognize that system memory 156 typically stores data and/or program modules that are immediately accessible to and/or currently being operated on by the processor 153. In this regard, the processor 153 serves as a computational center of the smart device 80 by supporting the execution of program instructions.

The storage system 154 is configured to store device information including and not limited to the device tag, the type of device, manufacturer, model, its primary variable and primary variable analog output. As explained above, the smart device may hold hundreds of parameters in storage system 154. The processor 153 communicates with the calibrator 10 using the one or more of the HART, FOUNDATION Fieldbus, PROFIBUS, and PROFINET protocols to transmit requested parameter information or store received parameter information or to broadcast parameter information once configured to do so. Other stored information is information received from a calibrator 10 through the I/O terminals 81, 82 or the wireless transceiver 122, which may include an IR communication in some embodiments. As shown, terminals 81, 82 are connected to jacks 16, 17. In an alternative embodiment, connection may be made through jack 11 (see FIG. 1). When information is received in the storage system 154, the processor 153 may be configured to execute instructions to directly display the information received from the received information and the operating and application programs.

Other information stored in the storage system 154 may include, but is not limited to, program modules and data to be accessed by the processor 153. Generally, program modules may include routines, applications, objects, components, data structures, etc., that perform particular tasks or implement particular abstract data types. It will be appreciated that system memory and storage memory described herein are merely examples of various computer-readable storage media.

Calibrator 10 is a DD-based DPC with profiles 134.n stored in its memory 131. The following description will explain the steps required to conduct a DD-based DPC calibration and finally a profile-based DPC calibration. A comparison of the conventional calibrations to the profile-based calibration will show how numerous steps are saved by the profile-based calibration using a profiled-based DPC.

DD-Based Calibration

Figure 4:
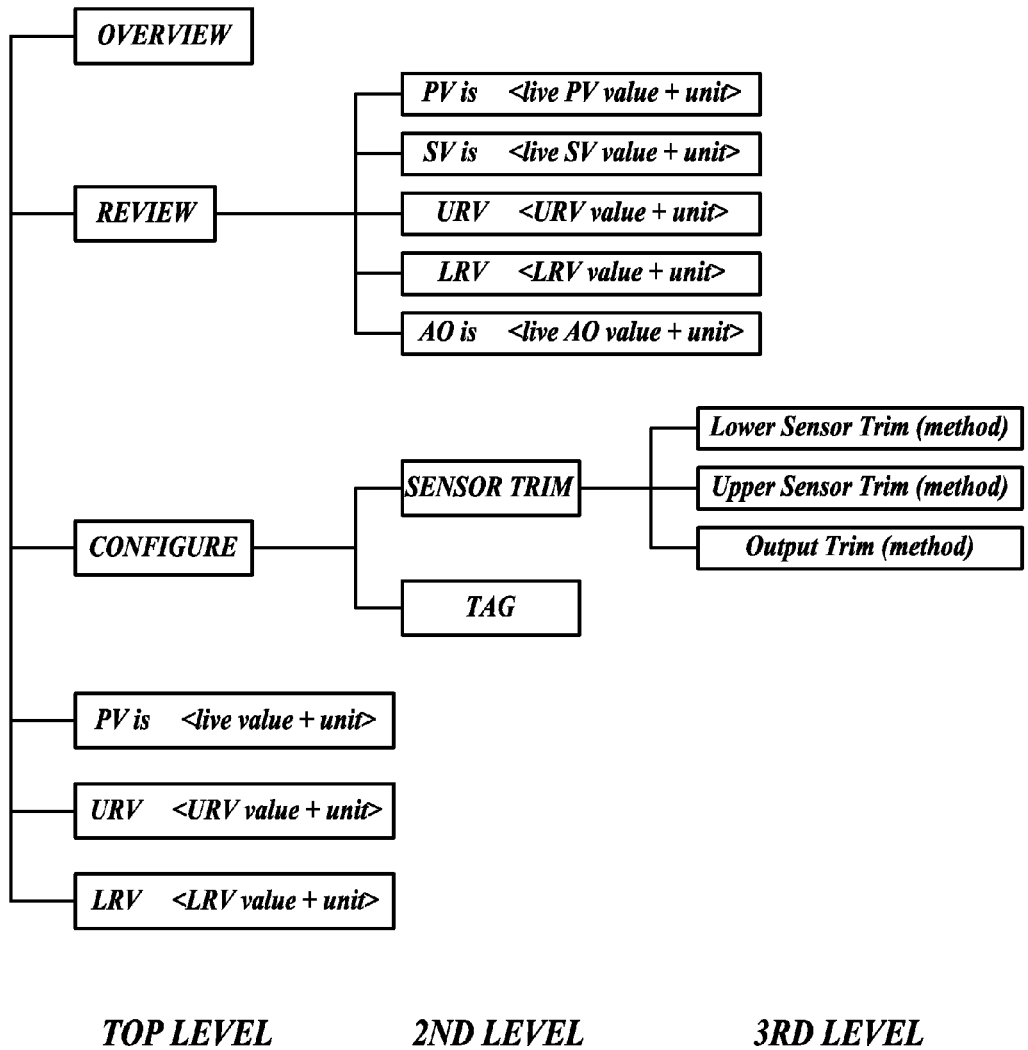
FIG. 4 is a simplified DD tree.

FIG. 4 includes examples of DD items in a DD tree that are used to conduct a typical DD-based calibration. Although a DD tree may hold hundreds of DD items, for purposes of explaining embodiments of the invention, FIG. 4 shows a simplified DD tree with only sixteen DD items disposed in three levels. Each level that has a lower level includes a menu showing the items in the adjacent, lower level. There are six top level items, including Overview, Review, Configure, PV (primary variable), URV (upper range value), and LRV (lower range value). There are seven second level items. The Review level has five second level items, PV, SV (secondary variable), URV, LRV and AO (analog output). Upon entering the Review level, a user is presented with a menu listing the items in the second level. The Configure level has two second level items including Sensor Trim and Tag. Sensor Trim has a third level with items: Lower Sensor Trim (method), Upper Sensor Trim (method), and Output Trim (method). An actual DD tree is more complex because any item in any level may be the basis for one or more subsequent levels each of which may contain one or more items. Although a DD tree is complex and tedious to navigate, it nevertheless provides a technician with at least one way to locate each of the hundreds of device variables of the smart device 80.

In order to perform verification, the technician must access one or more of the items in the DD tree and load the selected item into a DD-based calibrator. Once loaded, the calibrator knows either the live value or at least the location in the smart device 80 of the DD calibration items. DD-based calibrators may have shortcuts to sequentially load LRV, URV and the test strategy once their locations are loaded into the calibrator.

Profile-Based Calibration

The profile-based DPC 10 streamlines the relatively slow manual calibration process described above as well the faster but still cumbersome calibration performed with DD-based DPCs. Instead of repeatedly finding and loading DD items into the calibrator, a number of pre-determined calibration setup items and favorites are loaded as default inputs to the calibrator 10 for performing verifications of the smart device 80.

The profile-based DPC calibrator 10 uses as default input locators provided by the profiles 134.n The storage system 131 holds DDs 134.n for a number of smart devices including, and not limited to, the smart pressure transmitter device 80. In particular, the storage system holds a profile 134.80 for storing locators to favorite and calibration setup information associated with the smart device 80 for calibrating device. The processor 133 executes verification and trim operations on the smart device based on the defaults.

The profiles 134.n in the calibrator 10 may be changed and any profile container may be copied and any copy may be further modified or copied. Each profile container may be copied and sent to other calibrators via the wired or wireless communications between two calibrators. Another embodiment may use a personal computer to connect to a calibrator and copy profiles from the calibrator to the PC or to the calibrator from the PC.

TABLE A shows examples of favorites, some of which act as one source of values for calibration setup items. In the first column, host-manufacturer or user-defined identifiers for Favorites are listed, slot favorites are underlined, and user favorites are in italics. In the second column, the mapped DD items are in bold. The third column shows the smart device value for a mapped DD item or a mapped DD item label.

TABLE A

| Favorite Identifier | DD Item Mapped | Smart Device Value/Method |
|---|---|---|
| Device tag | TAG in the menu of the Configure level | Tag value |
| Primary Variable | PV in the top level | Live PV value + unit |
| Upper Range Value | URV in the top level | URV value + unit |
| Lower Range Value | LRV in the menu of the Review level | LRV value + unit |
| Calibration Variable | SV in the menu of the Review level | live SV + unit |
| Calibration Trim | Sensor Trim in the menu of the Configure level | Sensor Trim (method) |

TABLE A-continued

| Favorite Identifier | DD Item Mapped | Smart Device Value/Method |
|---|---|---|
| User favorite 1 | AO in the menu of the Review level | Live AO value + unit |
| User favorite 1 | Output trim in the menu of the Sensor Trim level which is under the menu of the CONFIGURE level | Output trim (method) under Configure/Sensor Trim |

The present disclosure streamlines the calibration process by allowing the technician to automatically calibrate a device by using the calibration setup and favorites of the profile as default inputs for the calibration process. As explained above, the calibration information includes the sequence of operations for a calibration including the measured parameter, the source in the calibrator to simulate the input of the measured parameter, the test range (0%-100%), the test specification (error tolerance), and test strategy (number of test points). Predetermined commonly used calibration setup information for each smart device is stored in the profile for the device. The vendor or user provides the calibration setup information that is stored in the profile and the favorite information are loaded as default inputs to the calibrator. As an alternative, the technician may manually change one or more of the default inputs. For example, the technician may select a different number of test points, or change the tolerance of error.

Figure 5:
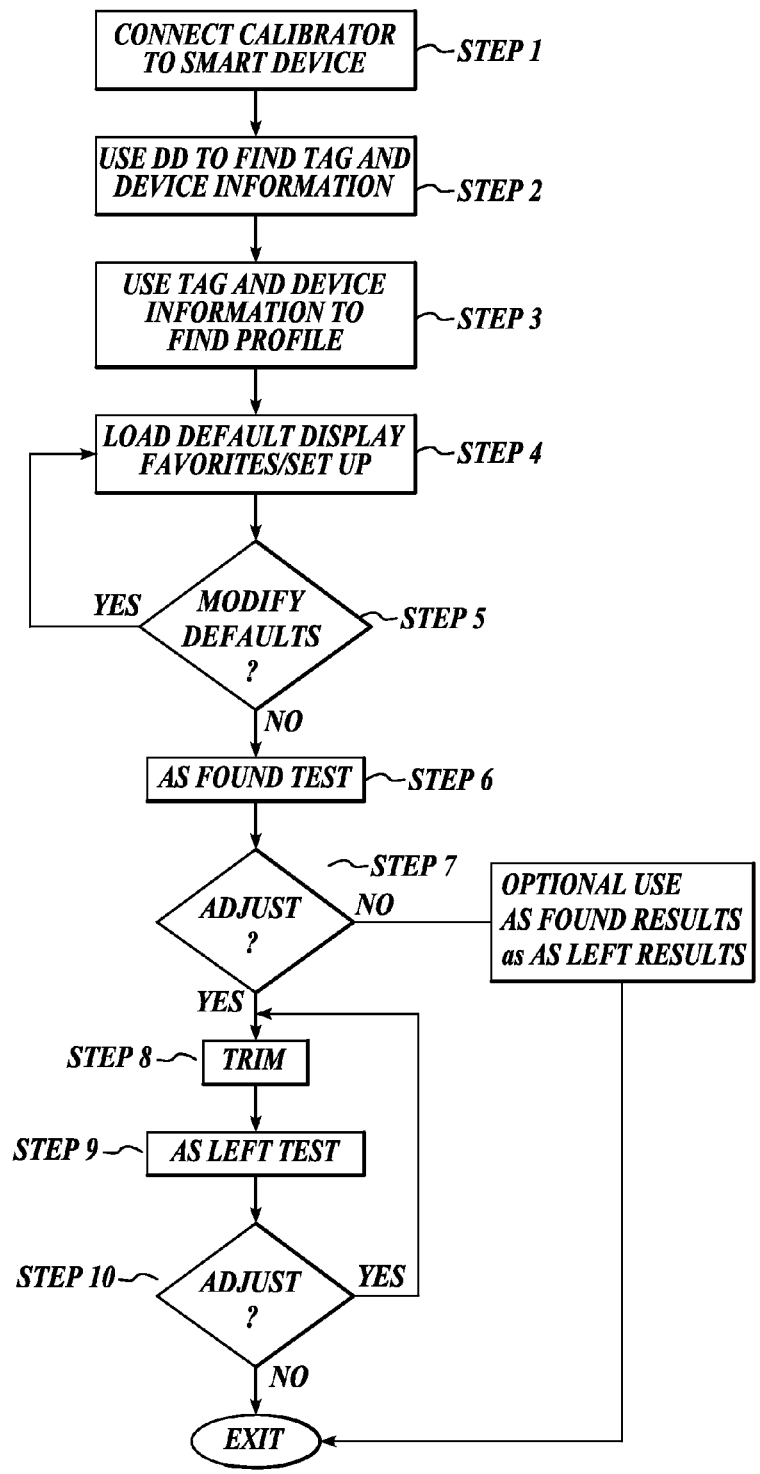
FIG. 5 is a flow chart of a method for calibrating a smart device.

In operation, a technician operates a calibrator to follow the steps shown in FIG. 5. In step 1, the technician couples a calibrator 10 to a smart device 80 via communication wires or a wireless communication channel. In step 2, the instrument utilizes universal commands of a HART, FOUNDATION Fieldbus, PROFIBUS or PROFINET protocol to locate and display the Tag and other device identification information of the smart device 80. The instrument shows the primary variable measured by the smart device 80 and the units of measurement, e.g., pressure at pounds per square inch. It also shows the manufacturer, model and other device identification information. In step 3 the calibrator searches the stored profiles to find the profile 134.80 for smart device 80 based Tag and other device identification information.

In step 4, the calibrator loads the favorites and configuration setup items as default inputs to the calibrator 10 and displays the favorite and calibration setup items on display 9. While there are eight favorites in TABLE A, the display 9 may be large enough to only show four of the eight favorites. The technician may review each profile item by scrolling up or down the displayed view using the arrow buttons 35.

The technician is now ready to perform a streamlined calibration. In some embodiments, the technician is provided with labels on one of the softkeys 27-30 that is operated to conduct an As Found verification. In step 5, the technician may, if desired, make one or more changes to the default values before verification of the smart device. If there are no changes or after all changes are made, the technician selects the appropriate softkey in step 6 and performs an As Found verification test. The results of the As Found test appear on display 9, including the values shown at the 0%, 100%, and any intermediate points.

In step 7, the calibrator indicates whether the results are within tolerance, based on test setup and tolerances that were stored in the profile. Another advantage of profile calibration is that the profile stores locators for the trim procedures. If the results are within tolerance, the calibration is complete, and the As Found results remain unchanged. In an alternative embodiment, the As Found results may be optionally used as the As Left results and exit the program. If the results are outside of tolerance and the smart device fails step 6, the profile stored in the calibrator provides the trim procedure for adjusting the smart device 80 in step 8 and re-testing. Trim procedures are performed in step 8 and an As Left Test is performed in step 9. If further adjustment is needed in step 10, the trim operation of step 8 is repeated until there are no further trims and the program exits. This simplifies user operation by eliminating the process of having to navigate the complex DD tree to identify the trim procedure. If, after adjustments, the smart device 80 passes its tests, the test results are stored as As Left results. If the smart device cannot be adjusted to pass the tests, the smart device 80 is replaced with another smart device which can be calibrated.

The profile-based DPC calibrator 10 and its methods have advantages compared to a DD-based DPC. For the simple sixteen-item DD shown in FIG. 4, the technician using the profile-based DPC was required to access the DD only once, to configure calibration setup and favorites unique to the smart device 80. In contrast, a technician using a DD-only based DPC would not only use the DD to acquire the Tag and device identity, but also would have to use the DD to acquire the PV, URV, and LRV items prior to conducting a standard calibration. Using the DD to access information from the smart device is tedious and takes time. In contrast, the profile-based DPC automatically loads a set of commonly required DD items for performing usual calibrations. With the profile-based DPC 80, the technician may only have to occasionally access the DD for non-profile information. Another advantage of the profile-based DPC is the ability for the technician to manually change the profile without having to access the full DD tree. Having accessed the locators for the DD items with the profiles, the technician may use the profiles to change any of the corresponding values stored in the smart device 80.

Each favorite locator for a DD item is selected by the user. The favorite may be many hierarchies deep, but each favorite holds a locator for the unique identifier in the DD. The profile stores the locators, not the live value that is read from the device. At any time the calibrator or communicator is connected to the device, a user may view favorites in a flat list as an alternate view to the DD Tree view. The flat list view will provide the user access to the same information that the DD provides, but only for the items that the vendor or user has added to favorites. In an alternative embodiment, favorites may be viewed in a list that may be a hierarchical list with a hierarchy that is different than that provided by the DD Tree view.

A technician may use the profiles to inspect values identified by the favorites without needing to browse the DD tree. Using a calibrator 10 or a communicator equipped with profiles of smart devices, the technician visits a number of smart devices during an inspection or maintenance tour of a process plant. At a location of a typical smart device 80, the technician couples the calibrator/communicator 10 to the smart device 80 using cables 6, 7 and input jacks 16, 17, or alternatively using jack 11, of the calibrator 10 and terminals 81, 82 of the smart device 80, or by operating the wireless transceivers 3, 122. As disclosed above, the profile 134.80 for each device includes one or more favorite parameters.

After an operator uses the calibrator/communicator to identify the profile 134.80 for the device 80, the technician may operate the calibrator/communicator to display the list of favorite parameters and the present value of the favorite parameter from the smart device.

While some embodiments of the invention have been shown and described, modifications and variations may be made thereto by those of ordinary skill in the art without departing from the spirit and scope of the present invention. In addition, it should be understood that aspects of the various embodiments may be interchanged either in whole or in part. Those of ordinary skill in the art will appreciate that the foregoing description is by way of example only, and is not intended to limit the invention, except as further described in the appended claims. Those skilled in the art will understand that other and equivalent components and steps may be used to achieve substantially the same results in substantially the same way as those described and claimed.

The invention claimed is:

1. A method of calibrating a smart device, wherein the smart device has a memory storing multiple items including items for calibrating the smart device, the method comprising:
providing one or more profile containers in an instrument for calibrating the smart device, each profile container comprising locators for preselected items, said preselected items including favorite items and calibration setup items, and said favorite items including slot favorites and user favorites, wherein a slot favorite is defined by a host manufacturer or vendor of the smart device, and via a defined name, informs a user of a specific preselected item that is mapped to the slot favorite, and wherein the favorite items are free-form favorites designatable by the user for any preselected item;
accessing one or more selected items in the smart device to identify the smart device;
associating at least one of the profile containers in the instrument with the identified smart device;
displaying a list of said locators for favorite items and calibration setup items from the associated profile container;
loading the preselected items of the associated profile container as default inputs to the instrument that configure the instrument for conducting one or more calibration operations on the smart device; and
conducting one or more calibration operations on the smart device by testing the smart device with the instrument to verify whether the smart device is operating within a predetermined tolerance.

2. The method of claim 1, further comprising storing results of said testing in an As Found entry in the associated profile container in the instrument.

3. The method of claim 1, further comprising:
if the smart device is operating within the predetermined tolerance, retaining the As Found entry in the associated profile container;
if the smart device is not operating within the predetermined tolerance, adjusting the operation of the smart device to be within the predetermined tolerance;
re-testing the smart device with the instrument to verify the smart device is within the predetermined tolerance; and
storing results of said re-testing in an As Left entry in the associated profile container in the instrument.

4. The method of claim 3, wherein adjusting the operation of the smart device utilizes a trim method stored in the associated profile container.

5. The method of claim 1, wherein the associated profile container includes both calibration setup items and favorite items.

6. The method of claim 1, wherein the list of said locators for favorite items and calibration setup items comprises a first set of slot locations corresponding to one or more predetermined items and a second set of locations for one or more items determined by a user.

7. The method of claim 1, wherein the favorite items include one or more of pressure, temperature, flow, position, resistance, voltage and current.

8. The method of claim 1, wherein the calibration setup items include one or more of: (a) a zero limit; (b) an upper limit; (c) one or more values between the zero limit and the upper limit; and (d) a delay time.

9. The method of claim 1, further comprising coupling the instrument to an auxiliary device that generates a known source parameter for testing the smart device.

10. The method of claim 1, wherein the smart device is of a first predetermined type, the method further comprising adjusting an operation of the smart device of the first predetermined type to produce measured values that are substantially the same as parameter values in the profile container for smart devices of the first predetermined type.

11. An instrument for calibrating a smart device, wherein the smart device has a memory storing multiple items including items for calibrating the smart device, the instrument comprising:
a processor for reading and executing programs;
a memory for holding programs and data;
a display for showing menus, lists, and data;
at least one input coupled to the processor for receiving measured parameter values from a smart device;
at least one output coupled to the processor for connecting the instrument to the smart device to adjust an operation of the smart device to adjust the measured parameter values from the smart device;
a plurality of profile containers in the memory, wherein each profile container is associated with a different smart device and each profile container comprises locators for preselected items, said locators corresponding to favorites items and calibration setup items, and said favorite items including slot favorites and user favorites, wherein a slot favorite is defined by a host manufacturer or vendor of the smart device, and via a defined name, informs a user of a specific preselected item that is mapped to the slot favorite, and wherein the favorite items are free-form favorites designatable by the user for any preselected item;
program instructions executable by the processor for identifying the smart device and locating the profile container associated with the smart device; and
program instructions executable by the processor for displaying the calibration setup items and the favorite items from the associated profile container in a list on the display and for loading the calibration setup items and favorites items as default inputs to the instrument for conducting one or more calibration operations on the smart device.

12. The instrument of claim 11, wherein the list comprises a first set of slot locations corresponding to one or more predetermined items and a second set of locations for one or more items selected by the user.

13. The instrument of claim 11, wherein the favorite items are pressure, temperature, flow, position, resistance, voltage, and current.

14. The instrument of claim 11, further comprising at least one second output coupled to the processor and an auxiliary device that generates a known source parameter for testing the smart device to verify whether the smart device is operating within a predetermined tolerance.

15. The instrument of claim 11, wherein the program instructions are executable by the processor for displaying the calibration setup items and the favorite items in a flat list on the display.

16. The instrument of claim 11, wherein the program instructions are executable by the processor for displaying the calibration setup items and the favorite items in a hierarchical list on the display.

17. The instrument of claim 14, wherein the auxiliary device is a pressure module.

18. The instrument of claim 14, wherein the auxiliary device is a drywell.

19. The instrument of claim 11, wherein the calibration setup items include one or more of: (a) a zero limit; (b) an upper limit; (c) one or more values between the zero limit and the upper limit; and (d) a delay time.

\* \* \* \* \*